US011628686B2

(12) United States Patent
Nakajima et al.

(10) Patent No.: US 11,628,686 B2
(45) Date of Patent: Apr. 18, 2023

(54) BICYCLE HUB ASSEMBLY

(71) Applicant: Shimano Inc., Sakai (JP)

(72) Inventors: Jun Nakajima, Sakai (JP); Kazuki Koshiyama, Sakai (JP)

(73) Assignee: SHIMANO INC., Sakai (JP)

( * ) Notice: Subject to any disclaimer, the term of this patent is extended or adjusted under 35 U.S.C. 154(b) by 490 days.

(21) Appl. No.: 16/845,800

(22) Filed: Apr. 10, 2020

(65) Prior Publication Data

US 2020/0238756 A1    Jul. 30, 2020

Related U.S. Application Data

(63) Continuation of application No. 15/287,751, filed on Oct. 7, 2016, now Pat. No. 10,654,314.

(51) Int. Cl.
*B60B 27/02* (2006.01)
*B60B 27/00* (2006.01)
*B60B 31/00* (2006.01)

(52) U.S. Cl.
CPC ........ *B60B 27/023* (2013.01); *B60B 27/0021* (2013.01); *B60B 27/0078* (2013.01); *B60B 31/00* (2013.01); *B60B 2310/305* (2013.01); *B60B 2310/318* (2013.01); *B60B 2360/10* (2013.01); *B60B 2360/104* (2013.01)

(58) Field of Classification Search
CPC .............. B60B 27/023; B60B 27/0021; B60B 27/0078; B60B 31/00; B60B 2310/305; B60B 2310/318; B60B 2360/10; B60B 2360/104
See application file for complete search history.

(56) References Cited

U.S. PATENT DOCUMENTS 1,375,149 A    4/1921    Haggerty
5,518,096 A    5/1996    Lin
(Continued)

FOREIGN PATENT DOCUMENTS

CN    100371180 C    2/2008
TW    1505951 B    11/2015

OTHER PUBLICATIONS

First Office Action of the corresponding Chinese Patent Application No. 201710874878.1, dated Mar. 20, 2020, 5pp.
(Continued)

*Primary Examiner* — Scott A Browne
(74) *Attorney, Agent, or Firm* — United IP Counselors, LLC

(57) ABSTRACT

The bicycle hub assembly includes a hub axle, a hub body, a bearing unit, a lock member, and a tool engagement member. The bearing unit is configured to rotatably support the hub body around the hub axle with respect to the rotational center axis. The bearing unit includes an outer race, an inner race and a plurality of rolling members. The lock member prevents the inner race of the bearing unit from rotating relative to the hub axle. The lock member has an outer peripheral surface. The tool engagement member is configured to rotate the inner race of the bearing unit relative to the hub axle. The tool engagement member has an inner peripheral surface. The inner peripheral surface of the tool engagement member is disposed radially outwardly relative to the outer peripheral surface of the lock member.

14 Claims, 9 Drawing Sheets

(56) References Cited

U.S. PATENT DOCUMENTS

| | | |
|---|---|---|
| 5,810,453 A | 9/1998 | O'Brien |
| 6,976,791 B2 | 12/2005 | Kanehisa et al. |
| 7,562,941 B2 | 7/2009 | Kanehisa |
| 10,654,314 B2 * | 5/2020 | Nakajima ........... B60B 27/0078 |
| 2003/0094849 A1 | 5/2003 | Joki et al. |
| 2010/0107946 A1 | 5/2010 | Cooney et al. |
| 2014/0070602 A1 | 3/2014 | Mouri et al. |
| 2014/0091614 A1 | 4/2014 | Fujita |
| 2015/0224822 A1 | 8/2015 | Lai |

OTHER PUBLICATIONS

Search Report from the corresponding German Patent Application No. 10 2017 008 543.9 dated May 8, 2018.
Office Action of the corresponding Taiwanese Patent Application No. 106130910, dated Jul. 29, 2020, 14 pp.
Office Action of the corresponding Taiwanese Patent Application No. 110126527, dated Dec. 16, 2021, 7 pp.

* cited by examiner

BICYCLE HUB ASSEMBLY

CROSS-REFERENCE TO RELATED APPLICATIONS

This application is a continuation application of U.S. patent application Ser. No. 15/287,751, filed Oct. 7, 2016. The contents of that application are incorporated by reference herein in their entirety.

BACKGROUND

Technical Field

The technology disclosed herein relates to a bicycle hub assembly.

Background Information

A bicycle wheel typically includes a bicycle hub assembly. The bicycle hub assembly is located in the center of the bicycle wheel.

A conventional bicycle hub assembly (e.g. U.S. Pat. No. 6,976,791 B2) includes a hub axle (10), a hub body (11), a bearing unit (13), and a lock member (15, 17). The hub axle (10) is mounted to a bicycle frame. The hub body (11) is rotatably supported around the hub axle (10) via the bearing unit (13). The bearing unit (13) is disposed between the hub axle (10) and the hub body (11).

The bearing unit (13) includes an outer race, an inner race (32) and a plurality of rolling members. The outer race is mounted to an inner peripheral surface of the hub body (11). The inner race (32) is disposed inside the hub body (11) in a radial direction and is threadably mounted to an outer peripheral surface of the hub axle (10). The plurality of rolling members are disposed between the outer race and the inner race (32).

The lock member (15, 17) prevents the inner race (32) from rotating and retaining with respect to the hub axle. The lock member includes a rotation stopper (15) and a retaining member (17). The rotation stopper (15) has a plurality of inner splines to engage with a plurality of outer splines of the inner race (32) and is non-rotatably mounted to the hub axle. The retaining member (17) is mounted to an end of the hub axle (10) and retains the rotation stopper (15) with respect to the hub axle (10) in an axial direction.

In the above bicycle hub assembly, it is difficult to finely adjust an axial position of the inner race (32) on the hub axle (10), because fineness of adjustment about an axial position of the inner race (32) on the hub axle (10) depends on the total number of the inner splines of the rotation stopper (15) and the total number of the outer splines of the inner race (32).

In consideration of the problem, it is an object of the present invention to provide a bicycle hub assembly capable of finely adjusting an axial position of an inner race on a hub axle.

SUMMARY

In accordance with an aspect of the present invention, a bicycle hub assembly includes a hub axle, a hub body, a bearing unit, a lock member, and a tool engagement member.

The hub axle includes a first end, a second end, and an axle threaded portion. The second end is opposite to the first end in an axial direction parallel to a rotational center axis of the bicycle hub assembly. The axle threaded portion is formed on at least one of the first end and the second end. The hub body is rotatably supported around the hub axle with respect to the rotational center axis.

The bearing unit is configured to rotatably support the hub body around the hub axle with respect to the rotational center axis. The bearing unit includes an outer race, an inner race and a plurality of rolling members. The plurality of rolling members are disposed between the outer race and the inner race. The inner race includes a first torque-transmitting portion and a bearing threaded portion. The bearing threaded portion is configured to threadedly engage with the axle threaded portion of the hub axle.

The lock member is configured to prevent the inner race of the bearing unit from rotating relative to the hub axle in a fully assembled state where the bearing unit and the lock member are mounted to the hub axle. The lock member includes a first tool-engagement portion and a lock-member threaded portion. The lock-member threaded portion is configured to threadedly engage with the axle threaded portion. The lock member has an outer peripheral surface.

The tool engagement member is configured to rotate the inner race of the bearing unit relative to the hub axle in a state where the inner race is threaded onto the hub axle. The tool engagement member includes a second tool-engagement portion and a second torque-transmitting portion. The second torque-transmitting portion is configured to engage with the first torque-transmitting portion of the inner race. The tool engagement member has an inner peripheral surface.

The inner peripheral surface of the tool engagement member is disposed radially outwardly relative to the outer peripheral surface of the first lock member.

In accordance with another aspect of the present invention, a bicycle hub assembly includes a hub axle, a hub body, a bearing unit, and a lock member. The hub axle includes a first end, a second end, and an axle threaded portion. The second end is provided on the opposite side to the first end in an axial direction parallel to a rotational center axis of the bicycle hub assembly. The axle threaded portion is formed on at least one of the first end and the second end. The hub body is rotatably supported around the hub axle with respect to the rotational center axis.

The bearing unit is configured to rotatably support the hub body around the hub axle with respect to the rotational center axis. The bearing unit includes an outer race, an inner race and a plurality of rolling members. The plurality of rolling members are disposed between the outer race and the inner race. The inner race includes a bearing threaded portion. The bearing threaded portion is configured to threadedly engage with the axle threaded portion of the hub axle.

The lock member is configured to prevent the inner race of the bearing unit from rotating relative to the hub axle in a fully assembled state where the bearing unit and the lock member are mounted to the hub axle. The lock member includes a first tool-engagement portion and a lock-member threaded portion. The lock-member threaded portion is configured to threadedly engage with the axle threaded portion. The lock member has an outer peripheral surface.

The inner race of the bearing unit includes an inner race body and an axially extending part. The axially extending part includes a second tool-engagement portion spaced apart from the first tool-engagement portion in the axial direction. The second tool-engagement portion has an inner peripheral surface.

The inner peripheral surface of the second tool-engagement portion is disposed radially outwardly relative to the outer peripheral surface of the first lock member.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

<General Configuration of a Bicycle>

Figure 1:
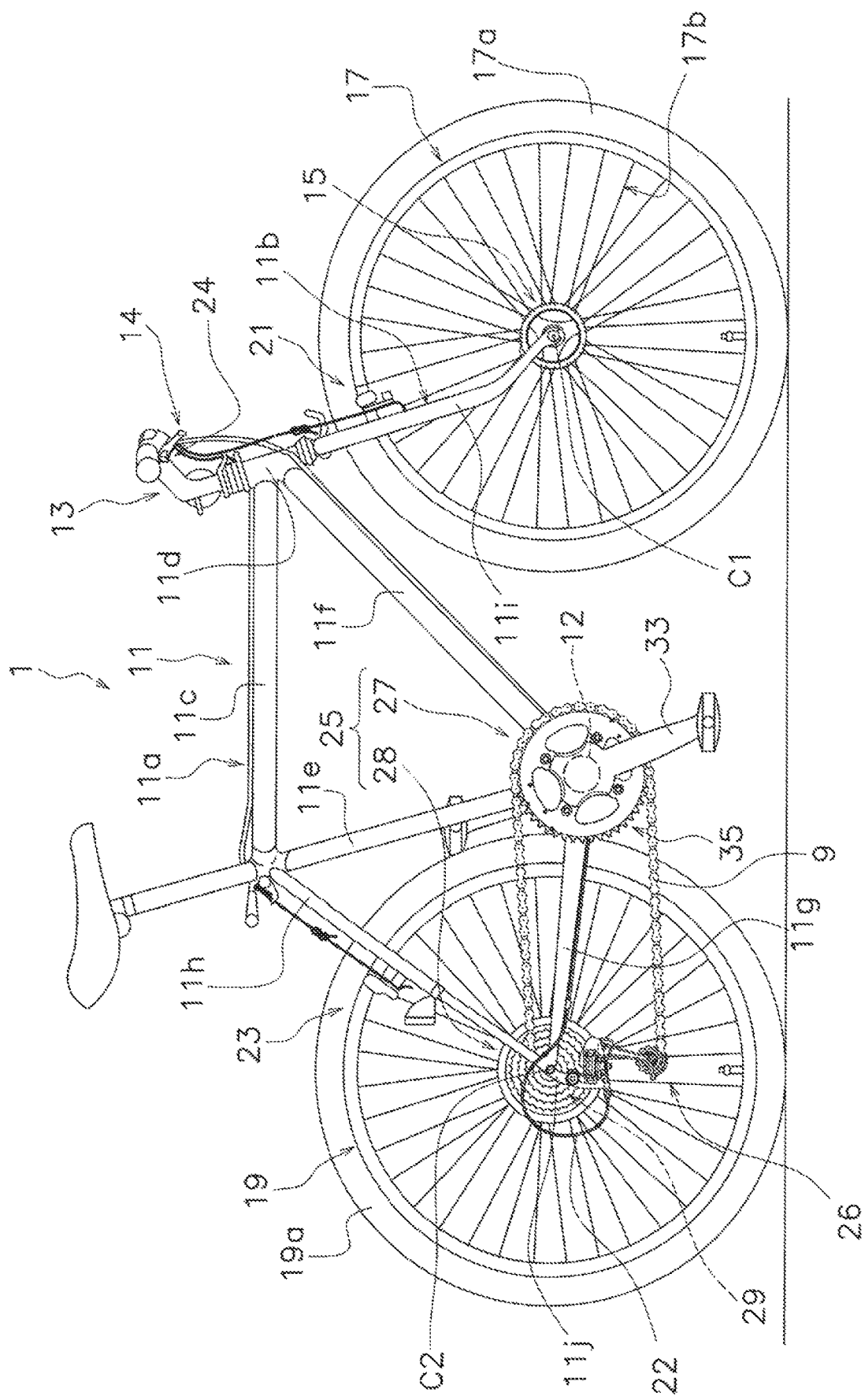
FIG. 1 is a side view of a bicycle according to a first embodiment of the present invention.

As shown FIG. 1, a bicycle 1 includes a bicycle chain 9, a frame 11, a handle 13, a front hub assembly 15 (an example of a bicycle hub assembly), front and rear wheels 17, 19, front and rear brake devices 21, 23, a shifting device 24, and a driving system 25.

The frame 11 includes a frame body 11a. The frame body 11a includes a top tube 11c, a head tube 11d, a seat tube 11e, a down tube 11f, a pair of chain stays 11g, a pair of seat stays 11h, and a bottom bracket hanger 12. A connection portion of the seat stay 11h and the chain stay 11g is described as a rear end 11j below.

A front fork 11b is rotatably attached to the head tube 11d of the frame body 11a. The front fork 11b includes a pair of leg portions 11i. Distal ends of the pair of leg portions 11i are described as a pair of front end 11k. The handle 13 is fixed to the front fork 11b.

The front hub assembly 15 is mounted to the front fork 11b. Specifically, the front hub assembly 15 is mounted between the pair of front ends 11k in an axial direction parallel to a rotational center axis C1 of the front hub assembly 15. The front hub assembly 15 is described in detail below.

The front wheel 17 is rotatably attached to the front fork 11b (the pair of leg portions 11i) via the front hub assembly 15. A front tire 17a is attached to the front wheel 17. The rear wheel 19 is rotatably attached to a rear portion of the frame body 11a (a pair of rear ends 11j) via a rear hub assembly 29 (another example of a bicycle hub assembly). A rear tire 19a is attached to the rear wheels 19.

The front and rear brake devices 21, 23 are operated by a brake operating device 14. The shifting device 24 is attached to the handle 13. The shifting device 24 operates a rear derailleur 26 via a control cable 22. The rear derailleur 26 moves the bicycle chain 9 from one rear sprocket of a rear sprocket assembly 28 to an adjacent rear sprocket of the rear sprocket assembly 28 by a shifting device 24 attaching to, e.g. the right side of the handle 13. The rear derailleur 26 is, for example, attached to the rear end 11j of the frame body 11a.

The driving system 25 mainly includes a crank assembly 27, the rear sprocket assembly 28, and the rear hub assembly 29.

The crank assembly 27 is rotatably supported on a lower portion of the frame body 11a, for example, the bottom bracket hanger 12. The crank assembly 27 mainly includes a crank axle (not shown), a right crank arm 33, a left crank arm (not shown), and the front sprocket assembly 35.

The front sprocket assembly 35 is attached to the right crank arm 33 so as to be integrally rotatable with the right crank arm 33. The front sprocket assembly 35 includes at least one front sprocket.

The rear sprocket assembly 28 is rotatably attached to a rear portion of the frame body 11a (the pair of rear ends 11j) via the rear hub assembly 29.

The rear hub assembly 29 is mounted on the rear portion of the frame body 11a (the pair of rear ends 11j). Specifically, the rear hub assembly 29 is mounted between the pair of rear ends 11j in an axial direction parallel to a rotational center axis C2 of the rear hub assembly 29. The rear hub assembly 29 is configured to mount the rear sprocket assembly 28 thereto and to rotatably support the rear sprocket assembly 28.

<Configuration of the Front Hub Assembly>

As shown in FIG. 1, the front hub assembly 15 rotatably supports the front wheel 17 via spokes 17b.

Figure 2:
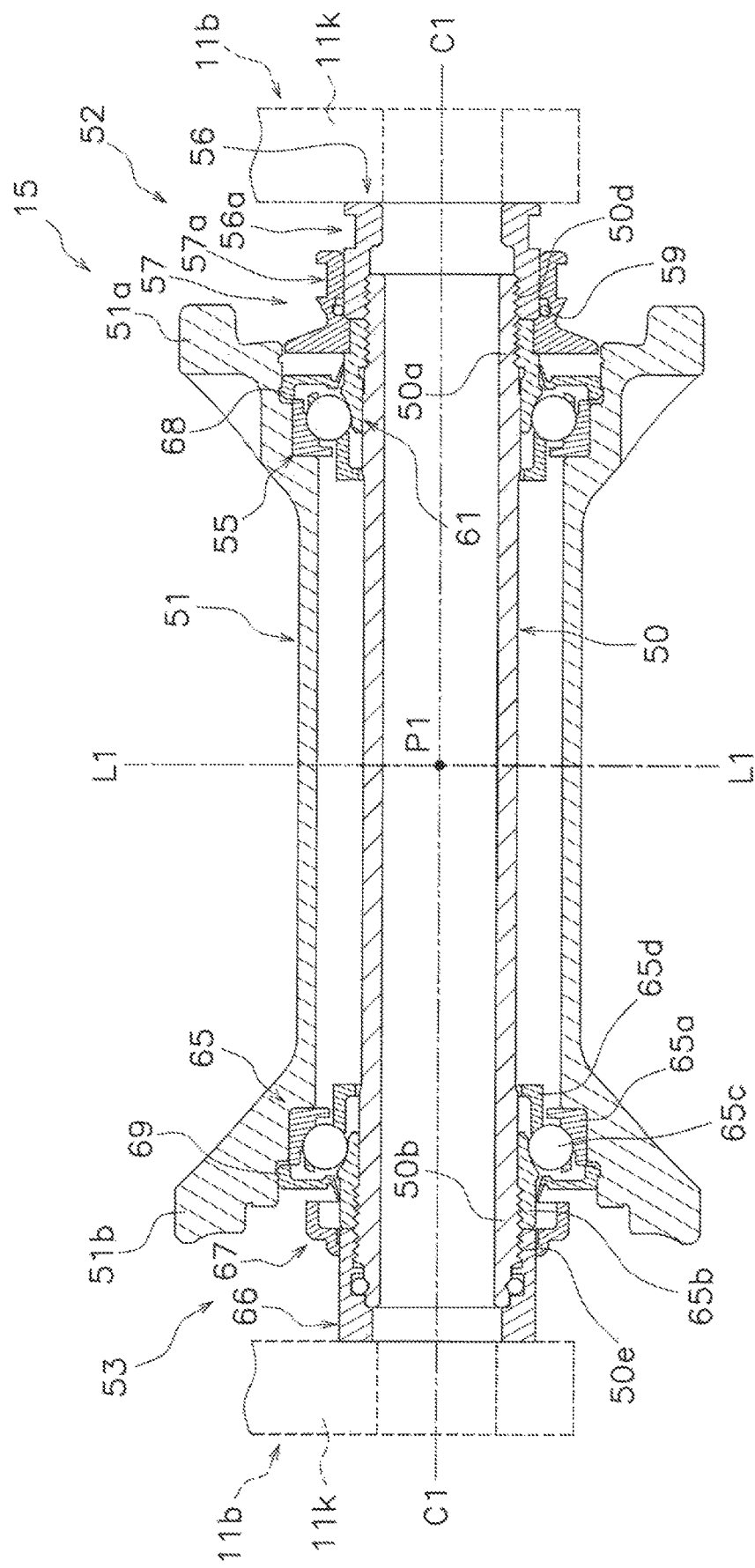
FIG. 2 is a cross-sectional view of a front hub assembly according to the first embodiment.

As shown in FIG. 2, the front hub assembly 15 comprises a hub axle 50, a hub body 51, a first lock structure 52, and a second lock structure 53. The front hub assembly 15 has an axial center line L1 perpendicular to the rotational center axis C1.

The axial center line L1 is defined between first and second ends 50a, 50b (as described below) of the hub axle 50. Specifically, the axial center line L1 passes an axial center point P1 on the rotational center axis C1 and is perpendicular to the rotational center axis C1.

(Hub Axle)

As shown in FIG. 2, the hub axle 50 has the first end 50a, the second end 50b opposite to the first end 50a in the axial direction parallel to the rotational center axis C1 of the front hub assembly 15, a first axle threaded portion 50d (an example of an axle threaded portion) formed on the first end 50a, and a second axle threaded portion 50e (another example of an axle threaded portion) formed on the second end 50b.

The first end 50a is provided on one end side of the hub axle 50, for example, on a right side end portion of FIG. 2. The second end 50b is provided on the opposite side to the first end 50a in the axial direction parallel to the rotational center axis C1 of the front hub assembly 15, for example, on a left side end portion of FIG. 2.

An axle threaded portion can be formed on at least one of the first end 50a and the second end 50b. Specifically, the first axle threaded portion 50d is formed on the first end 50a. Specifically, the first axle threaded portion 50d is formed on an outer peripheral surface of the first end 50a. For example, the first axle threaded portion 50d is a male threaded portion.

The second axle threaded portion 50e is formed on the second end 50b. Specifically, the second axle threaded portion 50e is formed on an outer peripheral surface of the second end 50b. For example, the second axle threaded portion 50e is a male threaded portion.

The hub axle 50 is supported by the front fork 11b. Specifically, the hub axle 50 is supported by the pair of front ends 11k of the front fork 11b, via a first lock member 56 (as described below) of the first lock structure 52 and a second lock member 66 (as described below) of the second lock structure 53.

For example, the hub axle 50 is mounted to the pair of front ends 11k via the first lock member 56 and the second lock member 66 by a wheel securing device (not shown).

The wheel securing device is the substantially same as the conventional device. For example, a shaft of a wheel securing device is inserted into a hollow portion of the hub axle 50, the first lock member 56, and the second lock member 66. One end of the shaft of the wheel securing device is screwed into one of the pair of front ends 11k after passing through the other of the pair of front ends 11k.

In the state, the hub axle 50, the first lock member 56, and the second lock member 66 is clamped between the pair of front ends 11k by operating a lever. The lever is mounted to the other end of the shaft so as to be outside the other of the pair of the front ends 11k.

(Hub Body)

As shown in FIG. 2, the hub body 51 is rotatably supported around the hub axle 50 with respect to the rotational center axis C1. Specifically, the hub body 51 is rotatably supported around the hub axle 50 via first and second bearing units 55, 65 (as described below).

The hub body 51 is formed in a substantially tubular shape. The hub body 51 includes a first hub flange 51a and a second hub flange 51b spaced apart from the first hub flange 51a in the axial direction. The first hub flange 51a is provided on one end portion of the hub body 51, for example, on a right side of FIG. 2.

One of the first hub flange 51a and the second hub flange 51b can extend axially outwardly from an inner race of a bearing unit with respect to the axial center line C1. The first hub flange 51a extends axially outwardly from a first bearing unit 55 (as described below) with respect to the axial center line L1. Specifically, the first hub flange 51a extends axially outwardly from a first inner race 61 (as described below) of the first bearing unit 55 with respect to the axial center line L1. For example, the first hub flange 51a is formed in a substantially corn shape.

The second hub flange 51b is provided on the other end portion of the hub body 51, for example, on a left side of FIG. 2. In other words, the second hub flange 51b is arranged spaced apart from the first hub flange 51a in the axial direction.

The second hub flange 51b extends axially outwardly from the second bearing unit 65 with respect to the axial center line L1. Specifically, the second hub flange 51b extends axially outwardly from a second inner race 65b (as described below) of the second bearing unit 65 with respect to the axial center line L1. For example, the second hub flange 51b is formed in a substantially corn shape.

(First Lock Structure)

As shown in FIG. 2, the first lock structure 52 includes, the first bearing unit 55 (an example of a bearing unit), the first lock member 56 (an example of a lock member), and a tool engagement member 57. In other word, the front hub assembly 15 comprises the first lock member 56 and the tool engagement member 57.

—First Bearing Unit—

As shown in FIG. 2, the first bearing unit 55 is configured to rotatably support the hub body 51 around the hub axle 50 with respect to the rotational center axis C1.

Figure 3:
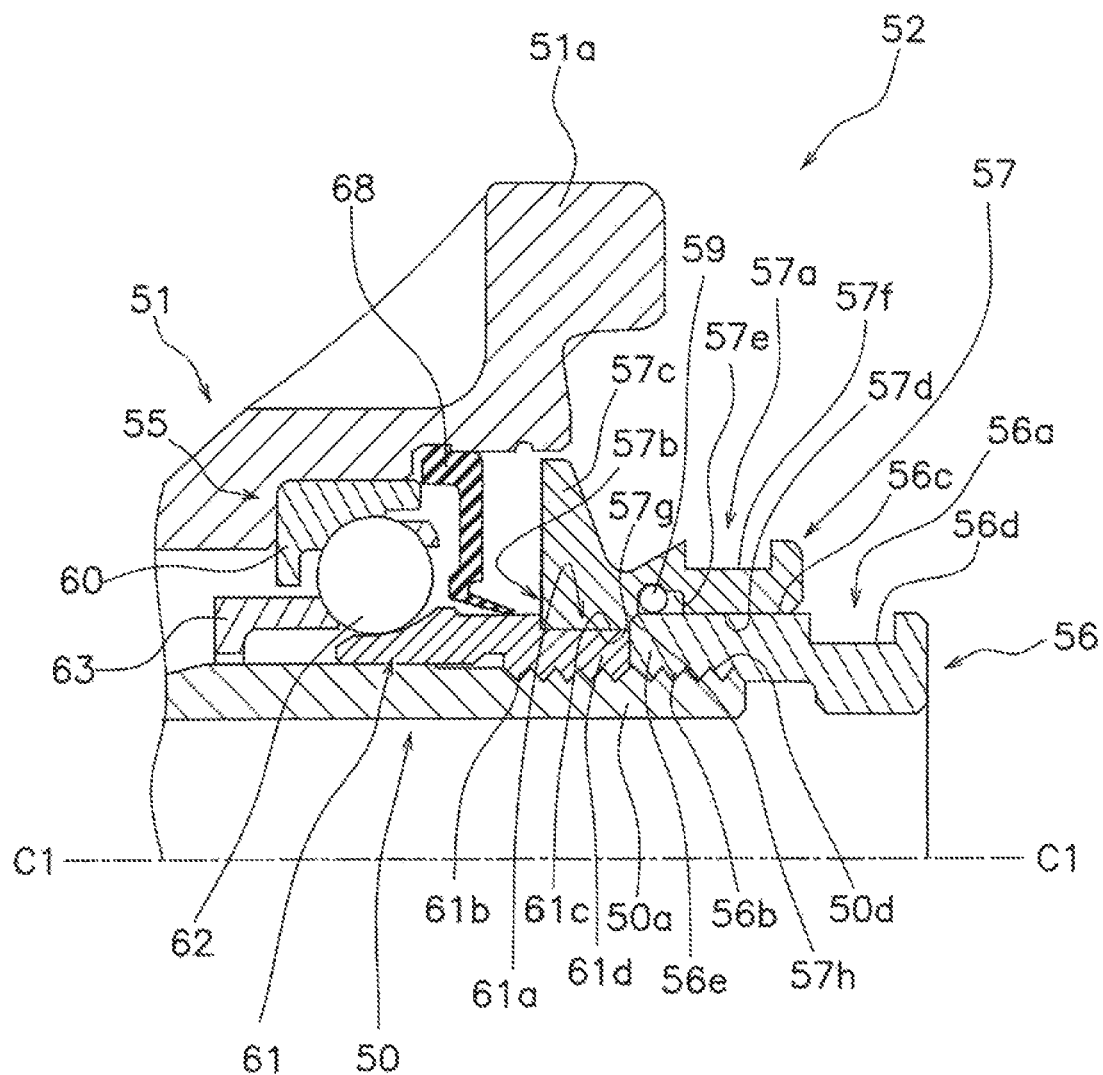
FIG. 3 is a partial cross-sectional view of a first lock structure according to the first embodiment.

As shown in FIG. 3, the first bearing unit 55 includes a first outer race 60 (an example of an outer race), the first inner race 61 (an example of an inner race), and a plurality of first rolling members 62 (an example of a plurality of rolling members) disposed between the first outer race 60 and the first inner race 61. Preferably, the first bearing unit 55 further includes a first retainer 63.

The first outer race 60 is fixedly mounted to the hub body 51. Specifically, the first outer race 60 is directly or indirectly attached to an inner peripheral surface of the hub body 51, for example, to an inner peripheral surface of the first hub flange 51a.

Figure 4:
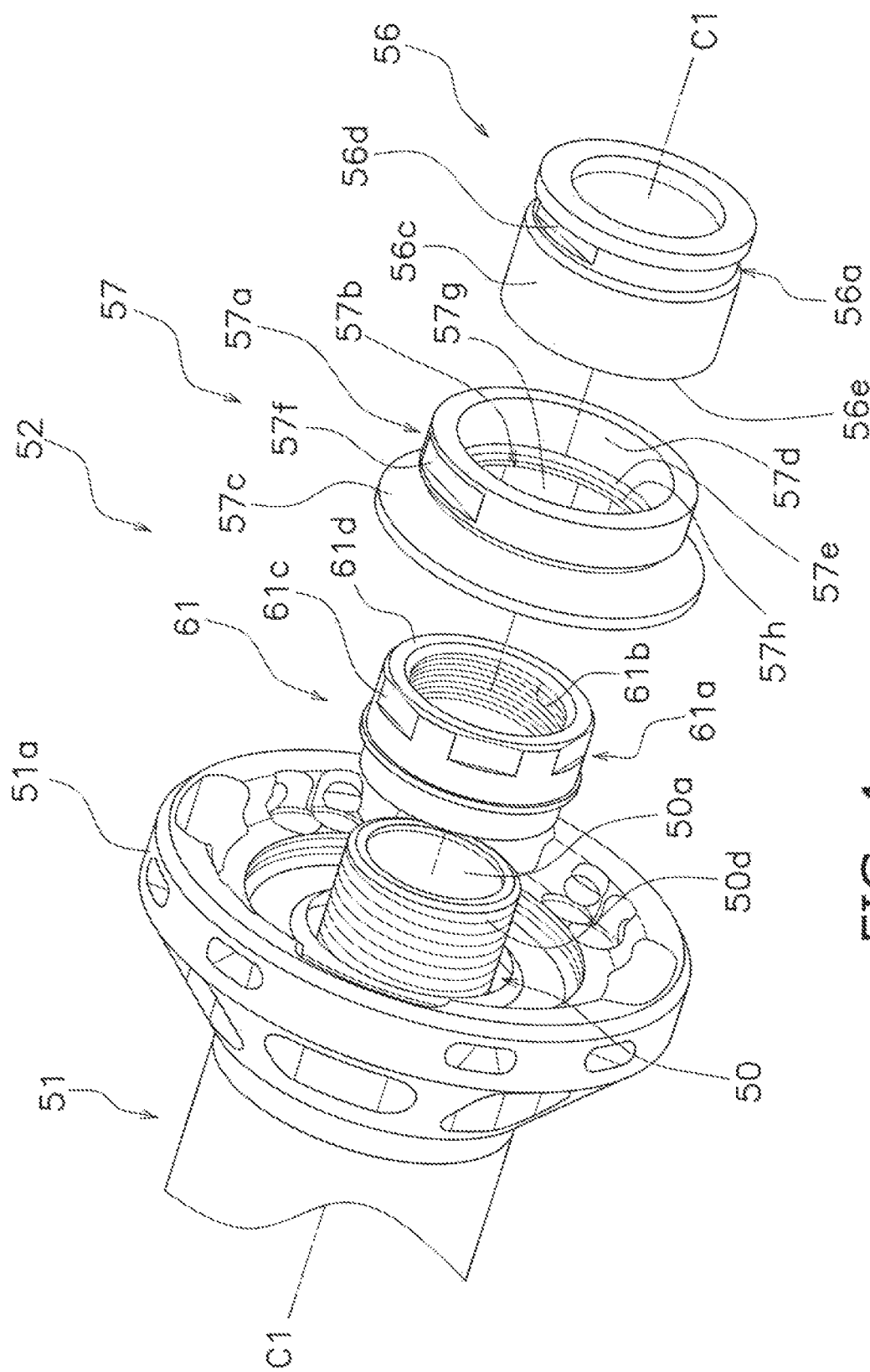
FIG. 4 is an enlarged perspective view showing a first lock structure according to the first embodiment.

As shown in FIGS. 3 and 4, the first inner race 61 is configured to engage with the tool engagement member 57 and the hub axle 50. The first inner race 61 has a first torque-transmitting portion 61a and a bearing threaded portion 61b.

The first inner race 61 is formed in a substantially tubular shape. The first torque-transmitting portion 61a is configured to engage with a second torque-transmitting portion 57b (as described below) of the tool engagement member 57.

The first torque-transmitting portion 61a is provided on an outer peripheral surface of the first inner race 61. The first torque-transmitting portion 61a includes at least one first linear surface 61c. Specifically, the at least one first linear surface 61c includes a plurality of first linear surfaces 61c (see FIG. 4).

The bearing threaded portion 61b is configured to threadedly engage with the first axle threaded portion 50d of the hub axle 50. The bearing threaded portion 61b is formed on an inner peripheral surface of the first inner race 61. For example, the bearing threaded portion 61b is a female threaded portion.

As shown in FIG. 3, the plurality of first rolling members 62 are disposed between the first outer race 60 and the first inner race 61. Each of the first rolling members 62 is formed in a substantially spherical shape. The first retainer 63 is configured to retain the plurality of first rolling members 62. The first retainer 63 is formed in a substantially annular shape.

—First Lock Member—

The first lock member 56 is configured to prevent the first inner race 61 of the first bearing unit 55 from rotating relative to the hub axle 50 in a state where the first bearing unit 55 and the first lock member 56 are mounted to the hub axle 50.

As shown in FIGS. 3 and 4, the first lock member 56 has a first tool-engagement portion 56a and a first lock-member threaded portion 56b (an example of a lock-member threaded portion). The lock member 56 is formed in a substantially tubular shape. The first lock member 56 has an outer peripheral surface 56c.

As shown in FIGS. 2 and 3, the first tool-engagement portion 56a is disposed axially outwardly from the first inner race 61 with respect to the axial center line L1. Specifically, the first tool-engagement portion 56a is disposed axially outwardly from the first hub flange 51a in a state where the first bearing unit 55 and the first lock member 56 are mounted to the hub axle 50.

The first tool-engagement portion 56a is configured to engage with a first tool. The first tool-engagement portion 56a may include a plurality of first tool-engagement linear surfaces 56d, for example, two first tool-engagement linear surfaces 56d.

The first tool-engagement portion 56a may include a first polygonal outer surface formed by a plurality of first tool-engagement linear surfaces 56d. The first tool-engagement polygonal outer surface 56d may be e.g. trigonal, quadrangular, pentagonal, hexagonal or octagonal outer peripheral surfaces. The first tool engages with the first tool-engagement polygonal outer peripheral surface 56d of the first tool-engagement portion 56a. For example, the first tool includes a normal wrench and a polygonal wrench and the like.

The first lock-member threaded portion 56b is configured to threadedly engage with the first axle threaded portion 50d. The first lock-member threaded portion 56b is formed on an inner peripheral surface of the first lock member 56. For example, the first lock-member threaded portion 56b is a female threaded portion.

The first lock member 56 has a first abutting portion 56e configured to abuts against the first inner race 61 and the tool engagement member 57. Specifically, as shown in FIG. 3, the first abutting portion 56e abuts against an axially outward end 61d of the first inner race 61 so as to prevent the first inner race 61 from rotating relative to the hub axle 50. The first abutting portion 56e abuts against a stepped portion 57h of the tool engagement member 57 so as to prevent the tool engagement member 57 from axially outwardly moving. The stepped portion 57h is formed on an inner peripheral surface of the tool engagement member 57

—Tool Engagement Member—

The tool engagement member 57 is configured to rotate the first inner race 61 of the first bearing unit 55 relative to the hub axle 50. Also, the tool engagement member 57 is configured to engage with a second tool.

As shown in FIGS. 3 and 4, the tool engagement member 57 is a separate member from the first inner race 61 of the first bearing unit 55. For example, the tool engagement member 57 is made of metal such as aluminum (for the purpose of weight-saving) and iron (for the purpose of enhancement of rigidity) and the like.

The tool engagement member 57 has a second tool-engagement portion 57a and the second torque-transmitting portion 57b. Preferably, the tool engagement member 57 has a cover portion 57c.

The tool engagement member 57 is formed in a substantially tubular shape. The tool engagement member 57 has an inner peripheral surface 57d.

The inner peripheral surface 57d is configured to be disposed radially outwardly from the outer peripheral surface 56c of the first lock member 56 in a state where the first lock member 56 and the tool engagement member 57 are mounted to the hub axle 50.

In this embodiment, as shown in FIG. 3, the front hub assembly 15 further comprises an elastic member 59. The elastic member 59 preferably has an annular shape. In other words, the elastic member 59 is formed in an annular shape. For example, the elastic member 59 may be an O-ring.

The elastic member 59 is disposed between the outer peripheral surface 56c of the first lock member 56 and the inner peripheral surface 57d of the tool engagement member 57 in a radial direction with respect to the rotational center axis C1.

One of the outer peripheral surface 56c of the first lock member 56 and the inner peripheral surface 57d of the tool engagement member 57 may include a recess 57e. In the illustrated embodiment, the inner peripheral surface 57d of the tool engagement member 57 includes the recess 57e. The elastic member 59 is disposed into the recess 57e.

As shown in FIGS. 2 and 3, the second tool-engagement portion 57a is disposed axially outwardly from the first inner race 61 of the first bearing unit 55 with respect to the axial center line L1.

Specifically, the second tool-engagement portion 57a is disposed axially outwardly from the first hub flange 51a in a state where the first bearing unit 55 and the first lock member 56 are mounted to the hub axle 50. The second tool-engagement portion 57a is disposed between the first inner race 61 of the first bearing unit 55 and the first tool-engagement portion 56a of the first lock member 56 in the axial direction.

The second tool-engagement portion 57a is configured to be engaged by a second tool. As shown in FIGS. 3 and 4, the second tool-engagement portion 57a is provided on an outer peripheral surface of the tool engagement member 57. The second tool-engagement portion 57a includes at least one second polygonal outer peripheral surface.

In the embodiment, the second tool-engagement portion 57a includes a plurality of second tool-engagement linear surfaces 57f, for example, two second tool-engagement linear surfaces 57f. The second tool-engagement portion 57a may include a second polygonal outer surface. Such a second polygonal outer surface may be formed by the plurality of second tool-engagement linear surfaces 57f.

The second tool engages with the plurality of second tool-engagement linear surfaces 57f of the second tool-engagement portion 57a. For example, the second tool includes a normal wrench and a polygonal wrench and the like.

As shown in FIG. 3, the second torque-transmitting portion 57b is configured to engage with the first torque-transmitting portion 61a of the first inner race 61. Specifically, the second torque-transmitting portion 57b is configured to engage with the first torque-transmitting portion 61a of the first inner race 61 in a state where the first bearing unit 55 and the tool engagement member 57 are mounted to the hub axle 50.

As shown in FIGS. 3 and 4, the second torque-transmitting portion 57b is provided on an inner peripheral surface of the third body portion 57a. The second torque-transmitting portion 57b includes at least one second linear surface 57g (see FIG. 4). Specifically, the at least one second linear surface 57g includes a plurality of second linear surfaces.

As shown in FIG. 3, the at least one second linear surfaces 57g of second torque-transmitting portion 57b is configured to contact the at least one first linear surface 61c of the first torque-transmitting portion 61a in a state where the first bearing unit 55 and the tool engagement member 57 are mounted to the hub axle 50.

Specifically, the tool engagement member 57 is fitted to the first inner race 61a by contact of the at least one first linear surface 61c and the at least one second linear surface 57g. In the state, the inner race 61 rotates integrally with the tool engagement member 57, when the tool engagement member 57 rotates by the second tool.

The cover portion 57c is configured to prevent foreign matters from entering inside of the hub body 51. As shown in FIGS. 3 and 4, the cover portion 57c is formed in a substantially annular shape and extends from the tool engagement member 57 toward the hub body 51, for example, the first hub flange 51a.

(Second Lock Structure)

The second lock structure 53 is briefly described, because the second lock structure 53 includes a substantially same configuration as the conventional one. The omitted configuration is equivalent to the conventional configuration.

As shown in FIG. 2, the second lock structure 53 includes the second bearing unit 65, the second lock member 66, and a cover member 67.

The second bearing unit 65 includes a second outer race 65a, the second inner race 65b, a plurality of second rolling members 65c, and a second retainer 65d.

The second outer race 65a is fixedly mounted to the hub body 51, for example, to an inner peripheral surface of the hub body 51.

The second inner race 65b is fixedly mounted to the hub axle 50. The plurality of second rolling members 65c are disposed between the second outer race 65a and the second inner race 65b.

The second lock member 66 prevents the second inner race 65b of the second bearing unit 65 from rotating relative to the hub axle 50 in a state where the second bearing unit 65 and the second lock member 66 are mounted to the hub axle 50. The second lock member 66 is mounted to the hub axle 50.

The plurality of second rolling members 65c are disposed between the second outer race 65a and the second inner race 65b. The second retainer 65d is configured to retain the plurality of second rolling members 65c. The cover member 67 is mounted to the second lock member 66, for example, an outer peripheral surface of the second lock member 66.

(Additional Configuration)

As shown in FIG. 2, the front hub assembly 15 further includes first and second seal member 68, 69. The first seal member 68 is disposed between the first outer race 60 of the first bearing unit 55 and the tool engagement member 57 in the axial direction. Specifically, the first seal member 68 is disposed between the first outer race 60 and the cover portion 57c of the tool engagement member 57 in the axial direction. The first seal member 68 is attached to an inner peripheral surface of the hub body 51, for example, to an inner peripheral surface of the first hub flange 51a.

The second seal member 69 is disposed between the second outer race 65a of the second bearing unit 65 and the cover member 67 in the axial direction. The second seal member 69 is attached to an inner peripheral surface of the hub body 51, for example, to an inner peripheral surface of the second hub flange 51b.

<Installation of the Front Hub Assembly>

Firstly, the second lock structure 53 is mounted to the hub body 51 and the hub axle 50. For example, the second outer race 65a and the second rolling members 65c are disposed between the hub body 51 and the hub axle 50. In this state, the second inner race 65b is screwed onto the second end 50b of the hub axle 50 in a conventional manner.

Next, the second lock member 66 is screwed onto the second end 50b of the hub axle 50 and prevents the second inner race 65b from rotating relative to the hub axle 50. Next, the second seal member is attached to an inner peripheral surface of the hub body 51 and the cover member 67 is mounted to an outer peripheral surface of the second lock member 66.

Secondly, the first outer race 60 and the first rolling members 62 are disposed between the hub body 51 and the hub axle 50. In this state, the tool engagement member 57 is engaged with the first inner race 61 and the first inner race 61 is screwed onto the first end 50a of the hub axle 50 by rotating the tool engagement member 57 with the second tool.

Specifically, the bearing threaded portion 61b of the first inner race 61 is screwed to the first axle threaded portion 50d of the hub axle 50 by rotating the tool engagement member 57 with the second tool.

Next, the first seal member 58 is attached to an inner peripheral surface of the hub body 51. Next, the first lock member 56 is screwed onto the first end 50a of the hub axle 50 by the first tool.

Specifically, the first lock-member threaded portion 56b of the first lock member 56 is screwed to the first axle threaded portion 50d of the hub axle 50 until the first lock member 56 abuts against the first inner race 61 (axially outward end 61d) and the tool engagement member 57 (the stepped portion 57h). Thus the first lock member 56 prevents the first inner race 61 and the tool engagement member 57 from rotating relative to the hub axle 50.

Second Embodiment

A configuration of a second embodiment is the substantially same as the configuration of the first embodiment, except for the configuration of the first lock member 56 of the first embodiment.

Explanation of the same configuration as the first embodiment is omitted in the second embodiment. The omitted configuration is equivalent to the configuration described in the first embodiment. About the same configuration as the first embodiment, the references of the first embodiment is indicated in the second embodiment.

(Third Lock Member)

Figure 5:
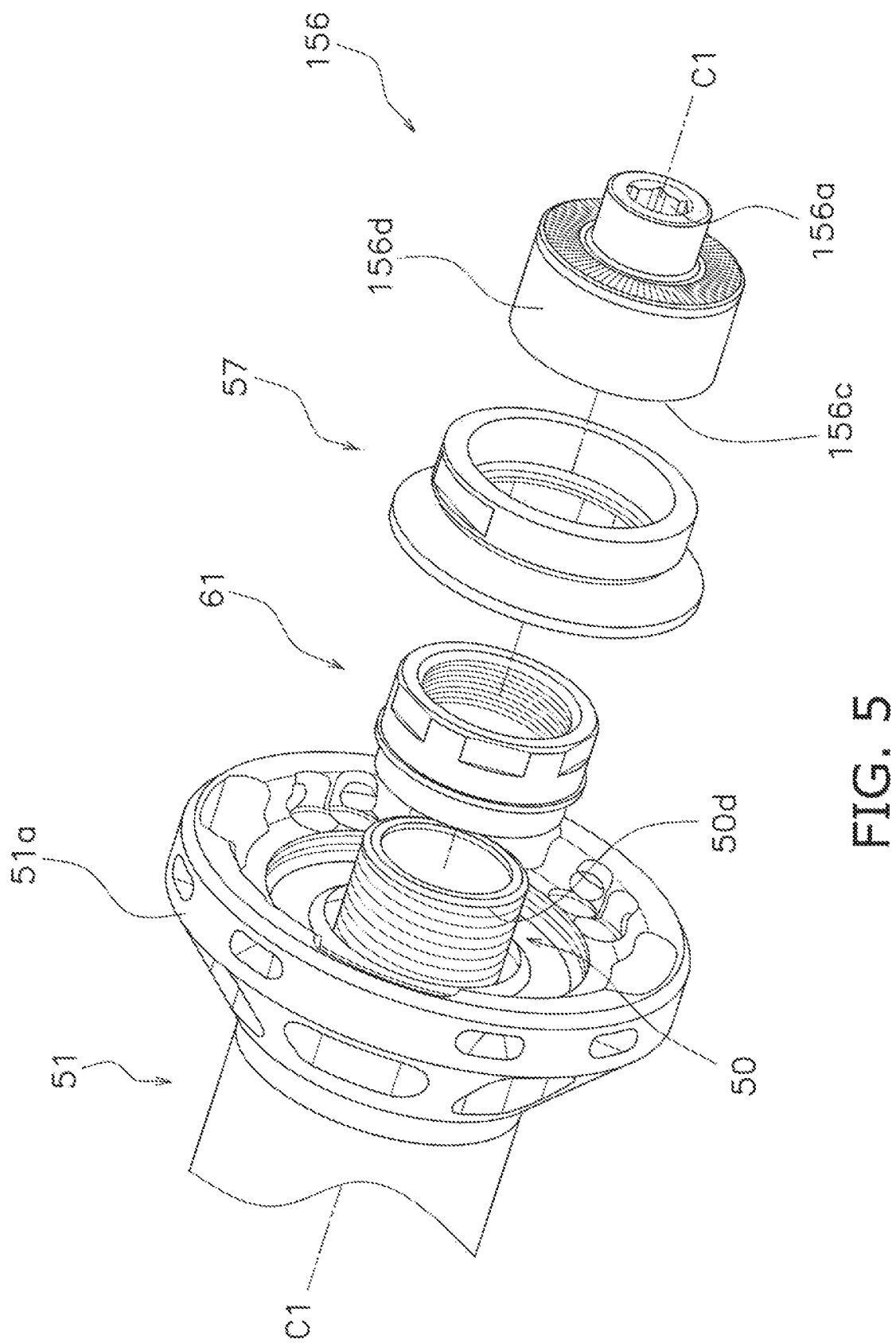
FIG. 5 is an enlarged perspective view showing a first lock structure according to a second embodiment.
Figure 6:
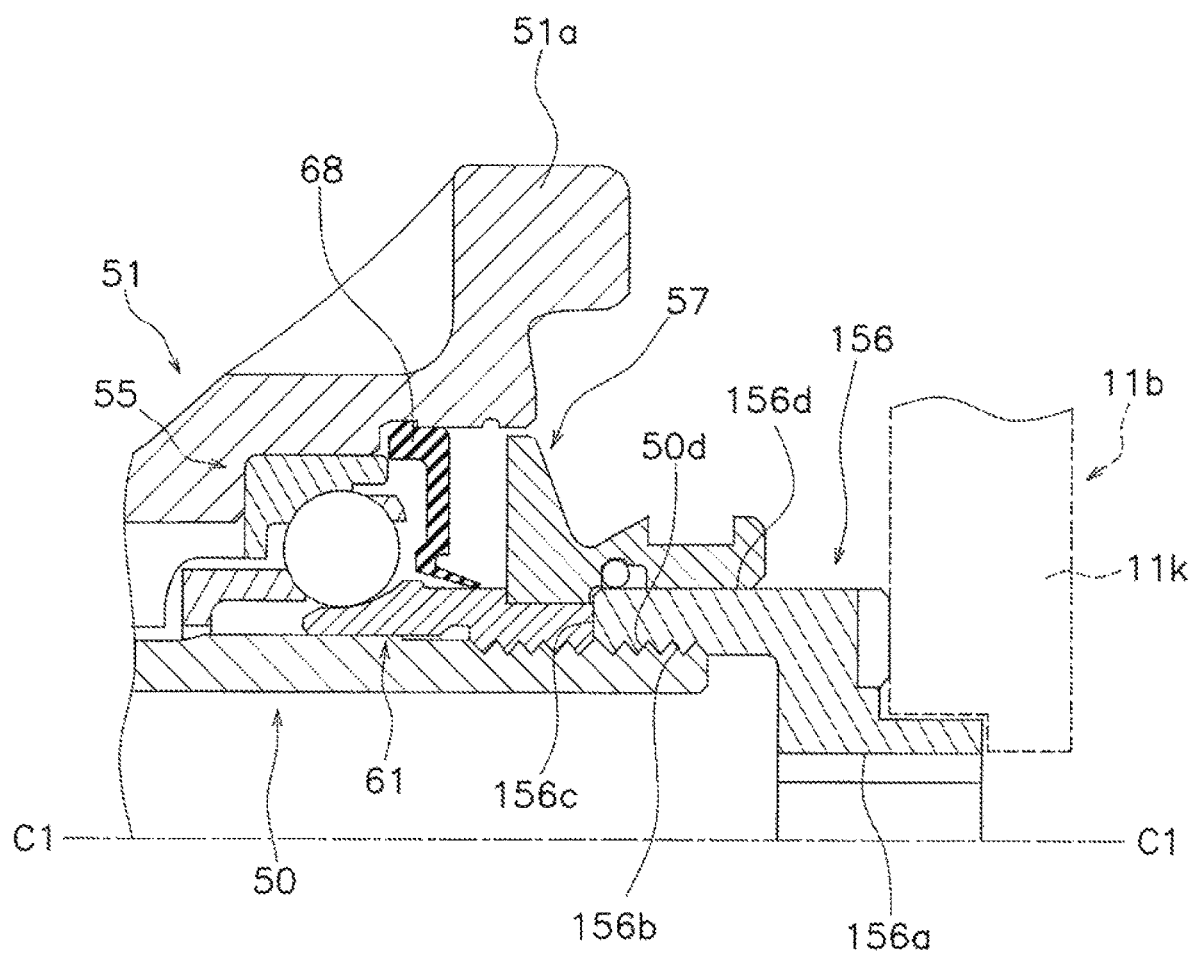
FIG. 6 is a partial cross-sectional view of a first lock structure according to the second embodiment.

In the second embodiment, as shown in FIGS. 5 and 6, a third lock member 156 (an example of a lock member), which corresponds to the first lock member 56 of the first embodiment, is configured as follows.

The third lock member 156 prevents the first inner race 61 of the first bearing unit 55 (see FIG. 2) from rotating relative to the hub axle 50 in a state where the first bearing unit 55 and the third lock member 156 are mounted to the hub axle 50.

As shown in FIGS. 5 and 6, the third lock member 156 has a third tool-engagement portion 156a (an example of a first tool-engagement portion) and a second lock-member threaded portion 156b (an example of a lock-member threaded portion). The third lock member 156 may further have a second abutting portion 156c.

The third lock member 156 is formed in a substantially tubular shape. The third lock member 156 has an outer peripheral surface 156d.

The third tool-engagement portion 156a is disposed axially outwardly from the first inner race 61 with respect to the axial center line L1 (see FIG. 2). The third tool-engagement portion 156a is configured to be engaged by a third tool. The third tool-engagement portion 156a is provided on an inner peripheral surface of a small-diameter portion of the third lock member 156.

The third tool-engagement portion 156a includes a polygonal hole. The third tool engages with the polygonal hole of the third tool-engagement portion 156a. For example, the third tool includes a hexagonal wrench and the like.

The second lock-member threaded portion 156b is configured to threadedly engage with the first axle threaded portion 50d of the hub axle 50. The second lock-member threaded portion 156b is formed on an inner peripheral surface of a large-diameter portion of the third lock member 156. For example, the second lock-member threaded portion 156b is a female threaded portion.

Explanation of the second abutting portion 156c is omitted, because a configuration of the second abutting portion 156c is the substantially same as the configuration of the first abutting portion 56e of the first embodiment.

(Additional Configuration)

In the second embodiment, the hub axle 50 is mounted on the pair of front ends 11k via the third lock member 156 and the second lock member 66 (see FIG. 2) by a wheel securing device (not shown).

The wheel securing device is the substantially same as the conventional device. For example, a shaft of a wheel securing device is inserted into a hollow portions of the hub axle 50, the third lock member 156, and the second lock member 66. Both end of the shaft of the wheel securing device pass through concave portions of the pair of front ends 11k.

In the state, the hub axle 50, the third lock member 156, and the second lock member 66 are clamped between a nut member and a lever. The nut is mounted to the one end of the shaft on the outside of one of the pair of the front ends 11k. The lever is mounted to the other end of the shaft on the outside of the other of the pair of the front ends 11k.

OTHER EMBODIMENTS (A) In the above embodiment, explanation is performed as an example that the tool engagement member 57 is a separate member from the first inner race 61 of the first bearing unit 55. Instead of this, the tool engagement member 57 and the first inner race 61 of the first bearing unit 55 can be formed as a one-piece, unitary member.

Figure 7:
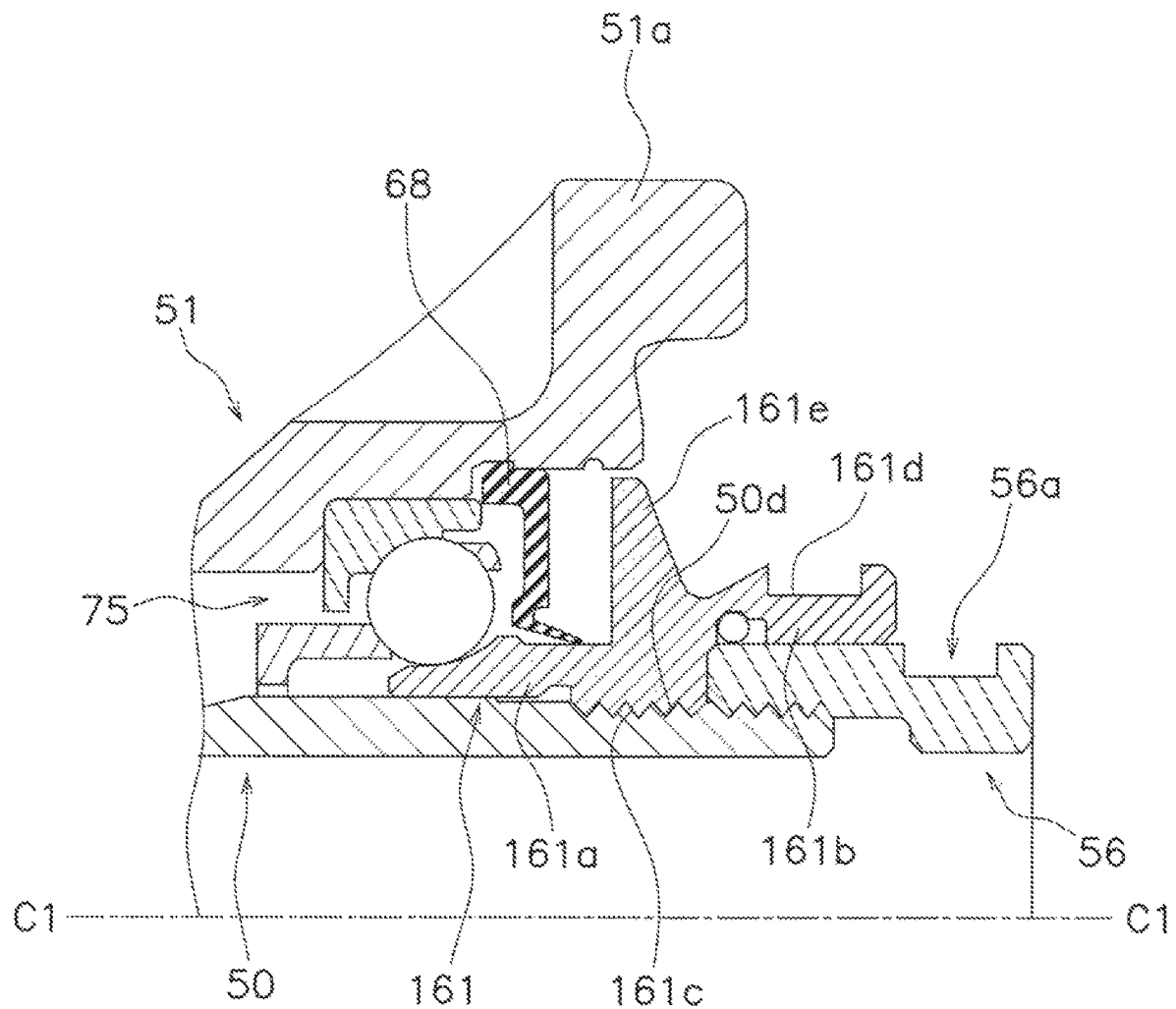
FIG. 7 is a partial cross-sectional view of a first lock structure according to the other embodiment (A)

In this case, as shown in FIG. 7, a third inner race 161, which corresponds to the tool engagement member 57 and the first inner race 61 of the first bearing unit 55 in the first embodiment, is configured as follows.

As shown in FIG. 7, a third inner race 161 of a third bearing unit 75 (an example of a bearing unit) includes an inner race body 161a and an axially extending part 161b. The inner race body 161a is a part which corresponds to the first inner race 61 of the above embodiment. The inner race body 161a includes a bearing threaded portion 161c. The bearing threaded portion 161c is configured to threadedly engage with the first axle threaded portion 50d of the hub axle 50.

The axially extending part 161b is a part which corresponds to the tool engagement member 57 of the above embodiment. The axially extending part 161b and the inner race body 161a of the third bearing unit 75 are formed as a one-piece unitary member. The axially extending part 161b extends from the inner race body 161a toward the first tool-engagement portion 56a in the axial direction. The axially extending part 161b has a fourth tool-engagement portion 161d (an example of a second tool-engagement portion) spaced apart from the first tool-engagement portion 56a in the axial direction. The fourth tool-engagement portion 161d is disposed between the inner race body 161a and the first tool-engagement portion 56a. One of the first hub flange 51a and the second hub flange 51b extends axially outwardly from the inner race body 161a. The first tool-engagement portion 56a and the fourth tool-engagement portion 161d are disposed axially outwardly from the one of the first hub flange 51a and the second hub flange 51b in a state where the third bearing unit 75 and the first lock member 56 are mounted to the hub axle 50.

The axially extending part 161b further includes a cover portion 161e. The configuration of the cover portion 161e is the substantially same as the configuration of the cover portion 57c of the first embodiment. Explanation of the cover portion 161e is omitted, because a configuration of the cover portion 161e is the substantially same as the configuration of the cover portion 57c of the first embodiment. The axially extending part 161b can be a separate member from the inner race body 161a.

Also, the above configuration of the third inner race 161 is applicable to the tool engagement member 57 and the first inner race 61 of the first bearing unit 55 in the second embodiment.

(B) In the above embodiment, explanation is performed as an example that the first and second torque-transmitting portion 61a, 57b includes a plurality of first and second linear surfaces respectively.

Figure 8:
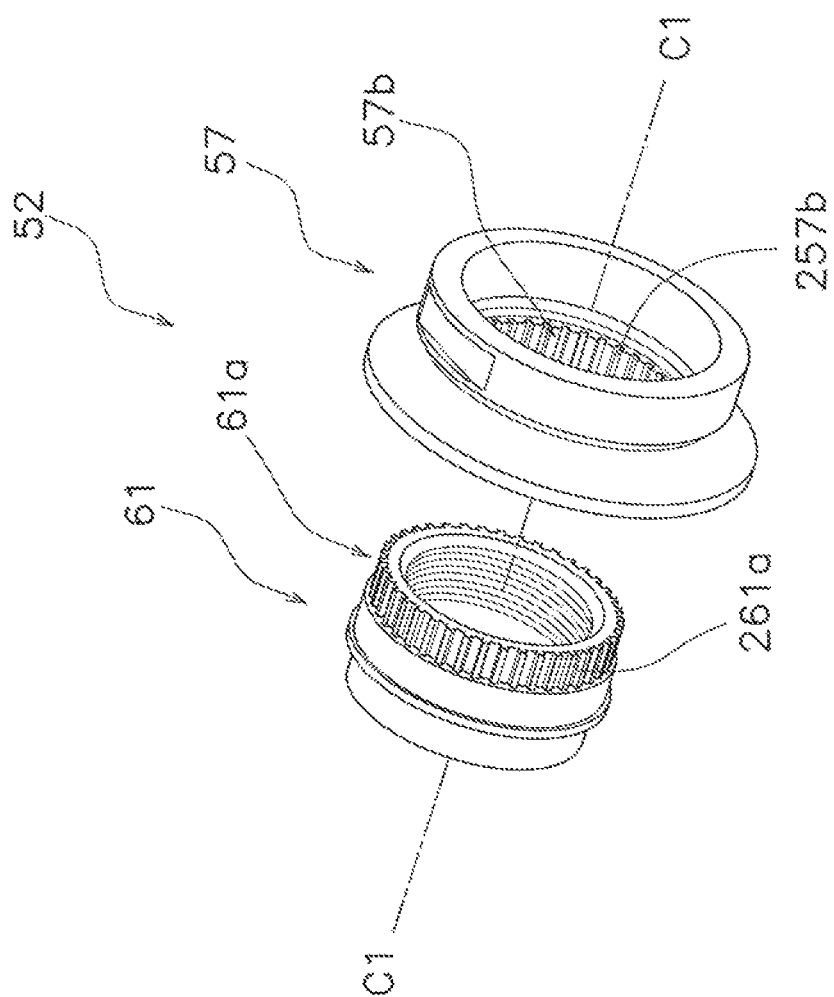
FIG. 8 is an enlarged perspective view showing a first lock member and a tool engagement member of a first lock structure according to the other embodiment (B)

Instead of this, as shown in FIG. 8, the first torque-transmitting portion 61a can include a plurality of first splines 261a. The second torque-transmitting portion 57b can include a plurality of second splines 257b configured to engage with the plurality of first splines 261a in a state where the first bearing unit 55 and the tool engagement member 57 are mounted to the hub axle 50.

For example, the plurality of first splines 261a is provided on an outer peripheral surface of the first inner race 61 and extends in the axial direction. The plurality of second splines 257b is provided on an inner peripheral surface of the third body portion 57a and extends in the axial direction.

(C) In the above embodiment, explanation is performed as an example that the first inner race 61 and the tool engagement member 57 rotate integrally by engaging the second torque-transmitting portion 57b with the first torque-transmitting portion 61a.

Figure 9:
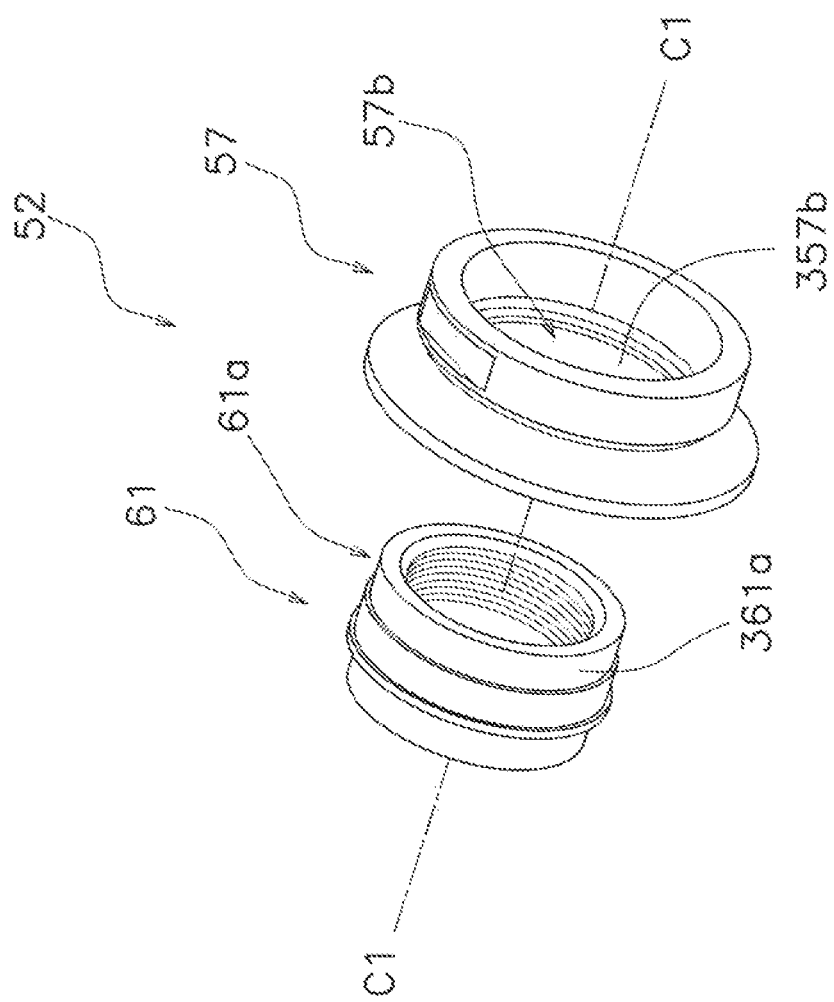
FIG. 9 is an enlarged perspective view showing a first lock member and a tool engagement member of a first lock structure according to the other embodiment (C).

As shown in FIG. 9, adhesive can be used for the first torque-transmitting portion 61a and the second torque-transmitting portion 57b. In this case, the first torque-transmitting portion 61a includes a first adhesively-attached surface 361a. The second torque-transmitting portion 57b includes a second adhesively-attached surface 357b. The second adhesively-attached surface 357b is configured to be attached to the first adhesively-attached surface 361a by adhesive.

(D) In the above embodiment, explanation is performed as an example that the second lock structure 53 is the conventional one. Instead of this, the second lock structure 53 can be the same configuration as the first lock structure 52.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below", "transverse", "inward" and "outward" as well as any other similar directional terms refer to those directions of the bicycle hub assembly in a state where the bicycle hub assembly are mounted to a bicycle. Accordingly, these terms, as utilized to describe the present technology should be interpreted relative to the bicycle hub assembly.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims.

For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

What is claimed is:

1. A bicycle hub assembly comprising:
   a hub axle having a first end, a second end opposite to the first end in an axial direction parallel to a rotational center axis of the bicycle hub assembly and an axle threaded portion formed on at least one of the first end and the second end;
   a hub body rotatably supported around the hub axle with respect to the rotational center axis;
   a bearing unit configured to rotatably support the hub body around the hub axle with respect to the rotational center axis and including an outer race, an inner race and a plurality of rolling members disposed between the outer race and the inner race, the inner race having a first torque-transmitting portion and a bearing threaded portion configured to threadedly engage with the axle threaded portion of the hub axle;
   a lock member configured to prevent the inner race of the bearing unit from rotating relative to the hub axle in a fully assembled state where the bearing unit and the lock member are mounted to the hub axle, the lock member having a first tool-engagement portion and a lock-member threaded portion configured to threadedly engage with the axle threaded portion, the lock member having an outer peripheral surface; and
   a tool engagement member configured to rotate the inner race of the bearing unit relative to the hub axle in a state where the inner race is threaded onto the hub axle and having a second tool-engagement portion and a second torque-transmitting portion configured to engage with the first torque-transmitting portion of the inner race, the tool engagement member having an inner peripheral surface, wherein
   the inner peripheral surface of the tool engagement member is disposed on and in direct contact with the outer peripheral surface of the lock member.

2. The bicycle hub assembly according to claim 1, wherein
   the first tool-engagement portion includes a plurality of first tool-engagement linear surfaces.

3. The bicycle hub assembly according to claim 1, wherein
   the second tool-engagement portion includes a plurality of second tool-engagement linear surfaces.

4. The bicycle hub assembly according to claim 1, wherein
   the second tool-engagement portion is disposed between the inner race of the bearing unit and the first tool-engagement portion of the lock member in the axial direction.

5. The bicycle hub assembly according to claim 1, wherein
   the second tool-engagement portion is disposed on an outer peripheral surface of the tool engagement member.

6. The bicycle hub assembly according to claim 1, wherein
   the first tool-engagement portion is disposed on an outer peripheral surface or an inner peripheral surface of the lock member.

7. A bicycle hub assembly comprising:
   a hub axle having a first end, a second end opposite to the first end in an axial direction parallel to a rotational center axis of the bicycle hub assembly and an axle threaded portion formed on at least one of the first end and the second end;
   a hub body rotatably supported around the hub axle with respect to the rotational center axis;
   a bearing unit configured to rotatably support the hub body around the hub axle with respect to the rotational center axis and including an outer race, an inner race and a plurality of rolling members disposed between the outer race and the inner race, the inner race having a bearing threaded portion configured to threadedly engage with the axle threaded portion of the hub axle; and
   a lock member configured to prevent the inner race of the bearing unit from rotating relative to the hub axle in a fully assembled state where the bearing unit and the lock member are mounted to the hub axle, the lock member having a first tool-engagement portion and a lock-member threaded portion configured to threadedly engage with the axle threaded portion, the lock member having an outer peripheral surface, wherein
   the inner race of the bearing unit includes an inner race body and an axially extending part having a second tool-engagement portion spaced apart from the first tool-engagement portion in the axial direction, the second tool-engagement portion having an inner peripheral surface, and
   the inner peripheral surface of the second tool-engagement portion is disposed on and in direct contact with the outer peripheral surface of the lock member.

8. The bicycle hub assembly according to claim 7, wherein
the first tool-engagement portion includes a plurality of first tool-engagement linear surfaces.

9. The bicycle hub assembly according to claim 7, wherein
the second tool-engagement portion includes a plurality of second tool-engagement linear surfaces.

10. The bicycle hub assembly according to claim 7, wherein
the second tool-engagement portion is disposed between the inner race body of the inner race and the first tool-engagement portion of the lock member in the axial direction.

11. The bicycle hub assembly according to claim 7, wherein
the second tool-engagement portion is disposed on an outer peripheral surface of the axially extending part.

12. The bicycle hub assembly according to claim 7, wherein
the first tool-engagement portion is disposed on an outer peripheral surface or an inner peripheral surface of the lock member.

13. A bicycle hub assembly comprising:
a hub axle having a first end, a second end opposite to the first end in an axial direction parallel to a rotational center axis of the bicycle hub assembly and an axle threaded portion formed on at least one of the first end and the second end;
a hub body rotatably supported around the hub axle with respect to the rotational center axis;
a bearing unit configured to rotatably support the hub body around the hub axle with respect to the rotational center axis and including an outer race, an inner race and a plurality of rolling members disposed between the outer race and the inner race, the inner race having a first torque-transmitting portion and a bearing threaded portion configured to threadedly engage with the axle threaded portion of the hub axle;
a lock member configured to prevent the inner race of the bearing unit from rotating relative to the hub axle in a fully assembled state where the bearing unit and the lock member are mounted to the hub axle, the lock member having a first tool-engagement portion and a lock-member threaded portion configured to threadedly engage with the axle threaded portion, the lock member having a radially outermost surface; and
a tool engagement member configured to rotate the inner race of the bearing unit relative to the hub axle in a state where the inner race is threaded onto the hub axle and having a second tool-engagement portion and a second torque-transmitting portion configured to engage with the first torque-transmitting portion of the inner race, the tool engagement member having an inner peripheral surface, wherein
the inner peripheral surface of the tool engagement member is disposed on the radially outermost surface of the lock member.

14. A bicycle hub assembly comprising:
a hub axle having a first end, a second end opposite to the first end in an axial direction parallel to a rotational center axis of the bicycle hub assembly and an axle threaded portion formed on at least one of the first end and the second end;
a hub body rotatably supported around the hub axle with respect to the rotational center axis;
a bearing unit configured to rotatably support the hub body around the hub axle with respect to the rotational center axis and including an outer race, an inner race and a plurality of rolling members disposed between the outer race and the inner race, the inner race having a bearing threaded portion configured to threadedly engage with the axle threaded portion of the hub axle; and
a lock member configured to prevent the inner race of the bearing unit from rotating relative to the hub axle in a fully assembled state where the bearing unit and the lock member are mounted to the hub axle, the lock member having a first tool-engagement portion and a lock-member threaded portion configured to threadedly engage with the axle threaded portion, the lock member having a radially outermost surface, wherein
the inner race of the bearing unit includes an inner race body and an axially extending part having a second tool-engagement portion spaced apart from the first tool-engagement portion in the axial direction, the second tool-engagement portion having an inner peripheral surface, and
the inner peripheral surface of the second tool-engagement portion is disposed on the radially outermost surface of the lock member.

* * * * *